Oct. 20, 1931.  H. F. KAPPERMAN  1,828,568
BRAKE MECHANISM
Filed Nov. 3, 1928   2 Sheets-Sheet 1
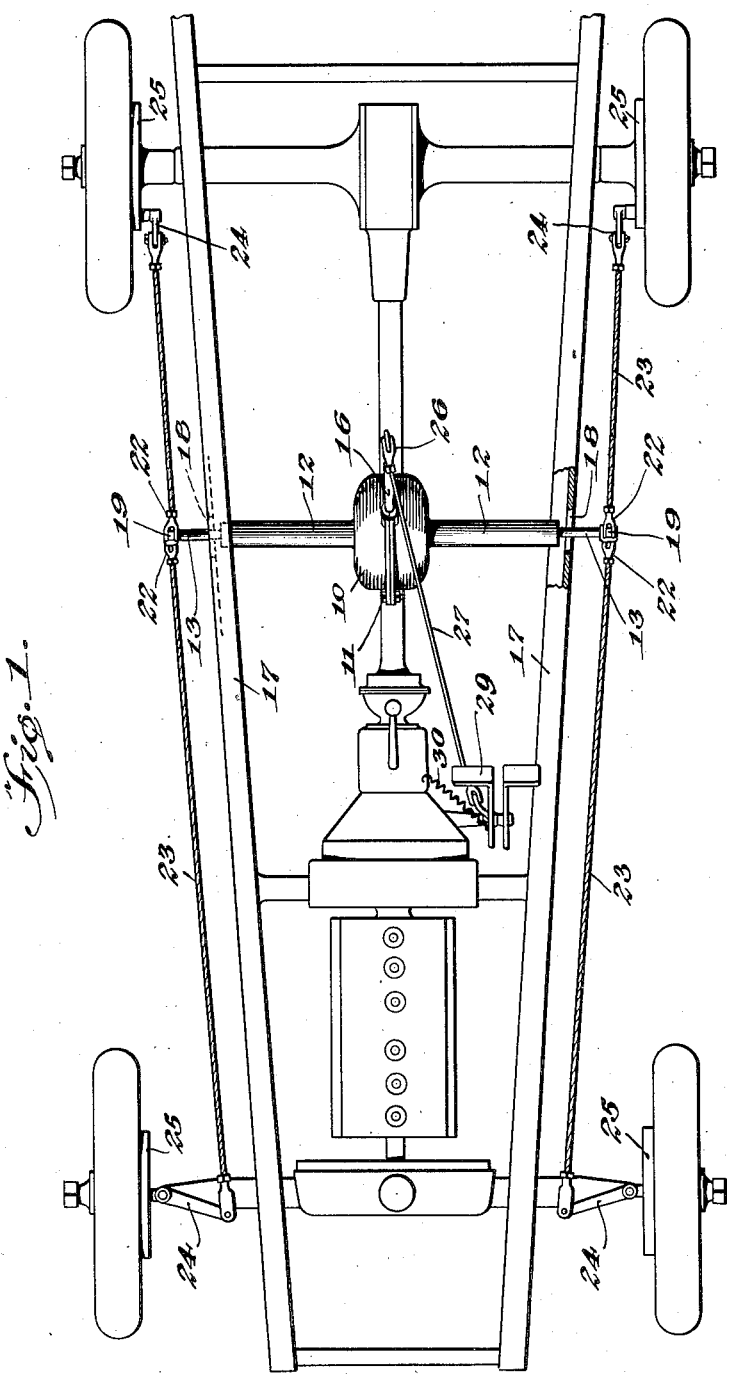
WITNESS
INVENTOR
H. F. Kapperman,
BY
ATTORNEY Oct. 20, 1931.   H. F. KAPPERMAN   1,828,568
BRAKE MECHANISM
Filed Nov. 3, 1928      2 Sheets-Sheet 2
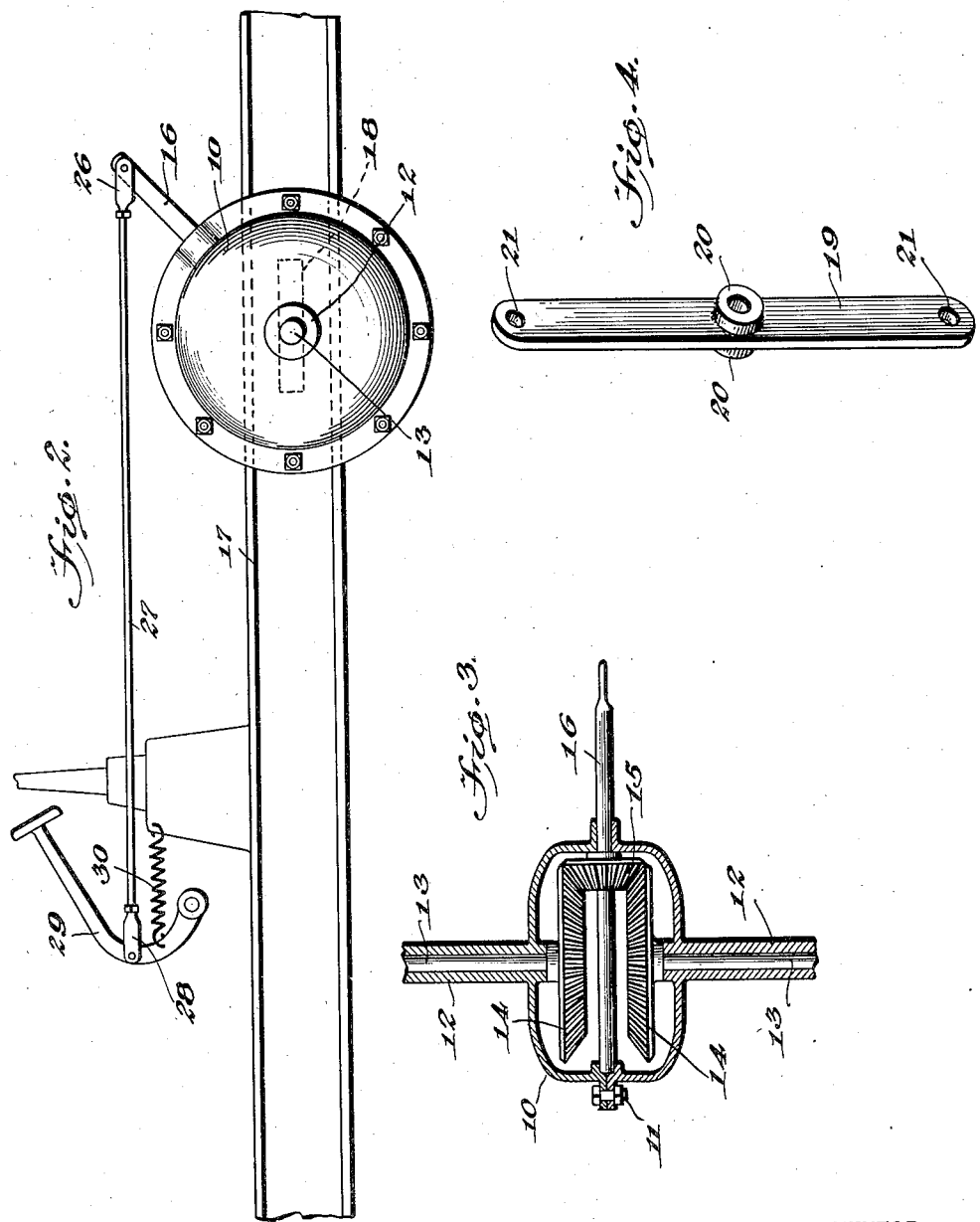
WITNESS
INVENTOR
H. F. Kapperman,
BY
ATTORNEY Patented Oct. 20, 1931

1,828,568

UNITED STATES PATENT OFFICE

HENRY F. KAPPERMAN, OF BASSETT, NEBRASKA

BRAKE MECHANISM

Application filed November 3, 1928. Serial No. 316,954.

This invention appertains to improvements in brake mechanisms generally, and more particularly to a type of the same adapted for use on automobiles and the like.

An object of the invention is to provide a mechanism of the class set forth, which is of an extremely simple and inexpensive but durable and efficient construction and arrangement of parts, and which embodies novel features of automatic equalization of pressure on the several brake members of an automobile in the event of the latter not being properly adjusted.

Another object of the invention is to provide a brake mechanism as hereinbefore characterized, which includes a differential means whereby the individual brake members at the opposite sides of an automobile are equalized as aforesaid before the brake and pressure is actually applied to the brakes.

With the foregoing and other equally important objects and advantages in view, the invention resides in the certain new and useful combination, construction and arrangement of parts as will be hereinafter more fully described, set forth in appended claim, and illustrated in the accompanying drawings, in which:

Figure 1 is a top plan view of the chassis of an automobile, and showing a practical application of the brake mechanism thereto, Figure 2 is an enlarged fragmentary vertical and longitudinal section, Figure 3 is an enlarged fragmentary sectional view through the differential housing portion of the mechanism, and Figure 4 is an enlarged perspective view of one of the brake actuating arms or levers.

Referring to the drawings, wherein like characters of reference designate corresponding parts throughout the several views thereof, the embodiment of the invention, as shown therein by way of example, comprises a circular housing which is preferably made in two parts, suitably bolted together as at 11, and has tubular extensions 12 projected outwardly from the centers of the opposite side walls thereof.

Journaled in these tubular extensions 12 are shaft sections 13 which have their inner ends projected into the housing portions complemental thereto to receive bevelled gears 14 on the same. These gears 14 are positioned relatively to each other to have their toothed bevelled portions meshed by a smaller bevelled gear 15, which is journaled on the inner end of an arm or lever 16 projecting outwardly of the housing 10.

This housing 10 is to be installed in a transverse position on an automobile chassis between the oppositely arranged side bars 17 thereof, and with the outer ends of the tubular extensions 12 slightly spaced from the opposed inner sides of the latter. The outer end portions of the shaft sections 13 are projected through horizontally elongated slots 18 formed in the side bars 17, and have arms or levers 19 keyed, or otherwise secured, at their centers on the extreme outer ends thereof. These arms or levers 19 are preferably bossed, as at 20, at the opposite sides of their points of engagement with the ends of the shaft sections 13 to give substantial bearing thereto, and have their opposite ends apertured, as at 21, for the pivoting to the same of the usual adjustable connectors 22 of the brake actuating members or cables 23 leading to the brake arms 24 of the brakes 25.

With the housing 10 thus placed in position within the chassis, the arm or lever 16 will be upwardly and rearwardly inclined, and have its free end pivoted to an adjustable connector 26 carried at the rearwardly directed end of a member or rod 27 leading to and pivotally connecting, through the medium of an adjustable connector 28, a foot pedal or the like 29, in the usual manner of such devices. A spring 30 is attached to the foot pedal 29 at one end, and at its other end to a suitable point on the chassis to return the parts to normally inoperative position, after the foot pedal has been subjected to the pressure of the foot of the operator.

In the operation of the brake mechanism, as thus constructed and arranged, the pressure of the foot of the operator on the foot pedal 29 will exert a forward pull on the arm or lever 16 through the medium of the member or rod 27, and the movement of the arm or lever 16 will rock or rotate the housing 10 in a similar construction. If the brakes 25 and their connections 22 and 23 are properly adjusted, so as to be perfectly equalized at the moment the housing 10 will be rocked or rotated as aforesaid in its normal position of operation, and the parts immediately applied since there will be no relative movement of the gears 14 and 15 and the shaft sections 13, and the arms or levers 19 keyed thereon will be rocked or rotated with the housing 10 as a unit.

However, in the event that any one or more of the brakes 25 and their connections 22 and 23 are out of proper and perfect adjustment, the application of the foot pressure of the operator on the pedal 29 will be transmitted to the arm or lever 16 and the housing 10, when the small gear 15 will first act to rotate one or the other or both of the gears 14 to cause the same to shift the arms or levers 19 to equalize the pull of the members on the cables 23 on the several brakes 25, and thereafter rock with the gears 14, and cause the immediate application of all of the brakes with equal effectiveness. Any undue slack in one or more of the members 23 extending between the arms or levers 19 and the brake actuating arms 24 will be compensated for by the bodily shifting of the housing 10 by movement of the outer end portions of the shaft sections 13 in the horizontal slotways 18 of the side bars 17 of the chassis, which will occur simultaneously and automatically with the rocking or rotating movement of the housing 10, when the latter is actuated from the foot pedal 29. In any case, upon the release of the foot pressure from the foot pedal 29, the entire brake mechanism returns to normal position in the usual manner, aided by the action of the spring 30.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

In a brake mechanism for automobiles or the like, a pair of shafts alined transversely of the chassis of an automobile and projecting outwardly thereof, levers secured at their centers on the outer ends of said shafts and operatively connected at their free ends to the brake members at the sides of the chassis to which they are complemental, a differential gearing operatively connecting the inner adjacent ends of said shafts, a housing enclosing said differential gearing and having the intermediate gear of the latter journaled at its inner side, said housing having oppositely extending portions to enclose the portions of the shafts extending between said gearing and the opposite sides of the said chassis and to give substantial support to both the housing and shafts, and means for rocking said housing to operate said differential gearing to first equalize the said brake members and to thereafter effectively apply the same.

HENRY F. KAPPERMAN.